H. T. KRAKAU.
CAR COUPLING.
APPLICATION FILED JUNE 1, 1908.

1,040,551.

Patented Oct. 8, 1912.

6 SHEETS—SHEET 1.

WITNESSES
R. A. Balderson
H. M. Corwin

INVENTOR
H. T. Krakau,
By Bakewell, Byrnes & Parmelee,
his Attys.

H. T. KRAKAU.
CAR COUPLING.
APPLICATION FILED JUNE 1, 1908.
1,040,551.
Patented Oct. 8, 1912.
6 SHEETS—SHEET 2.
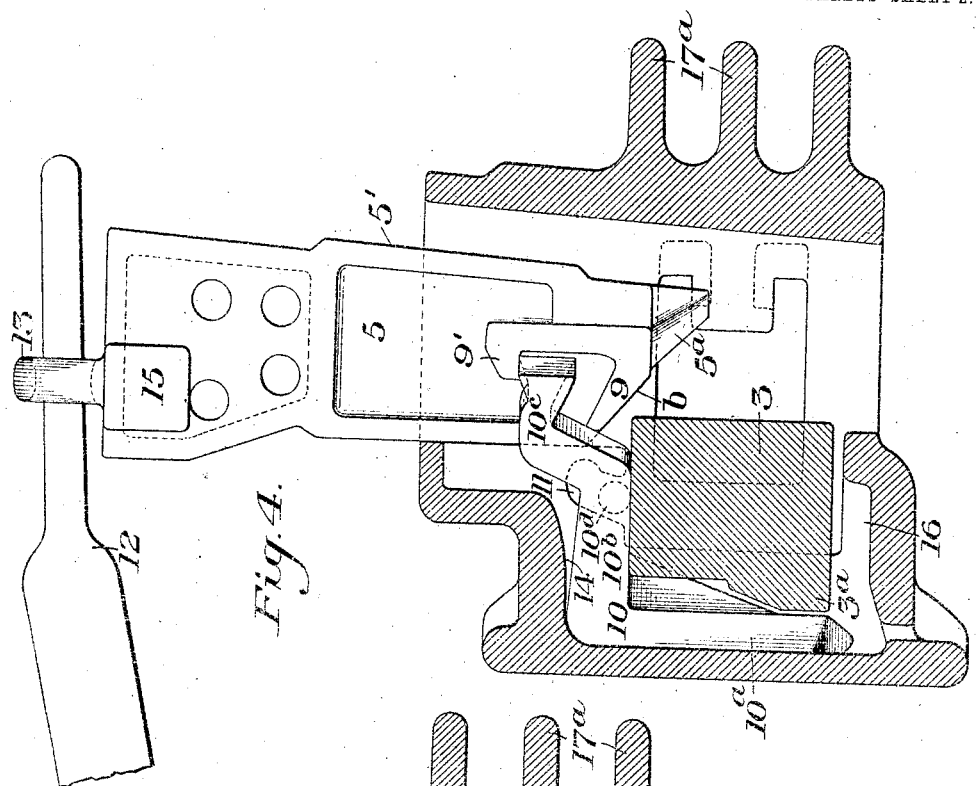
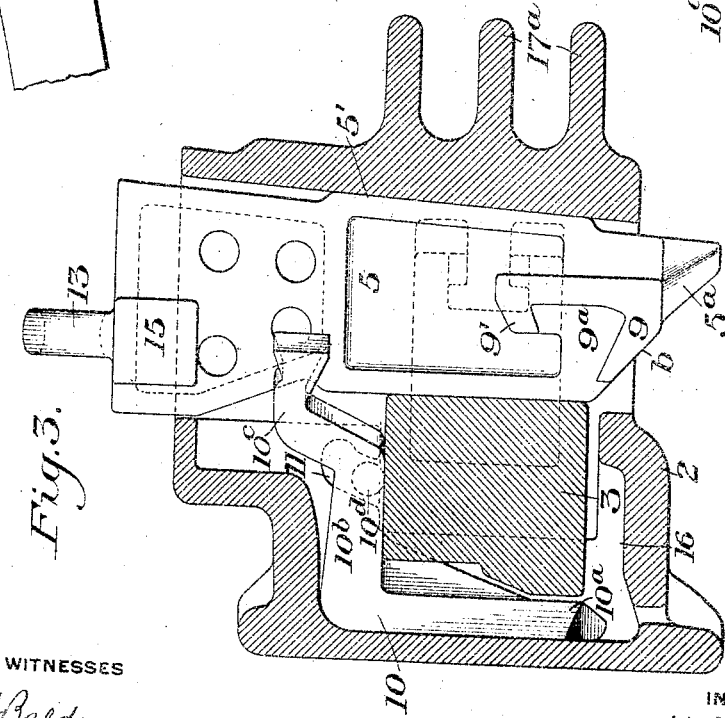

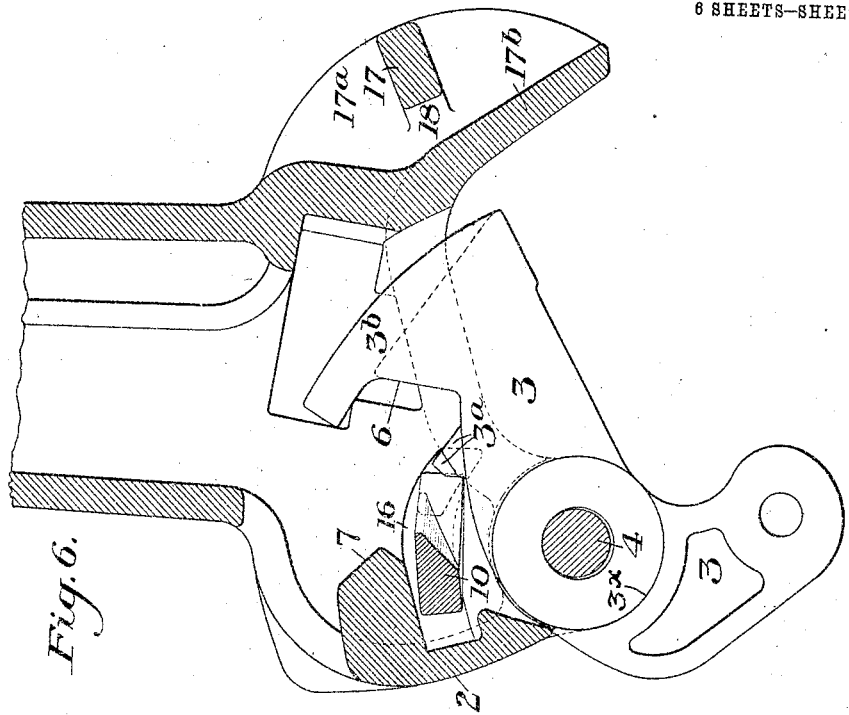
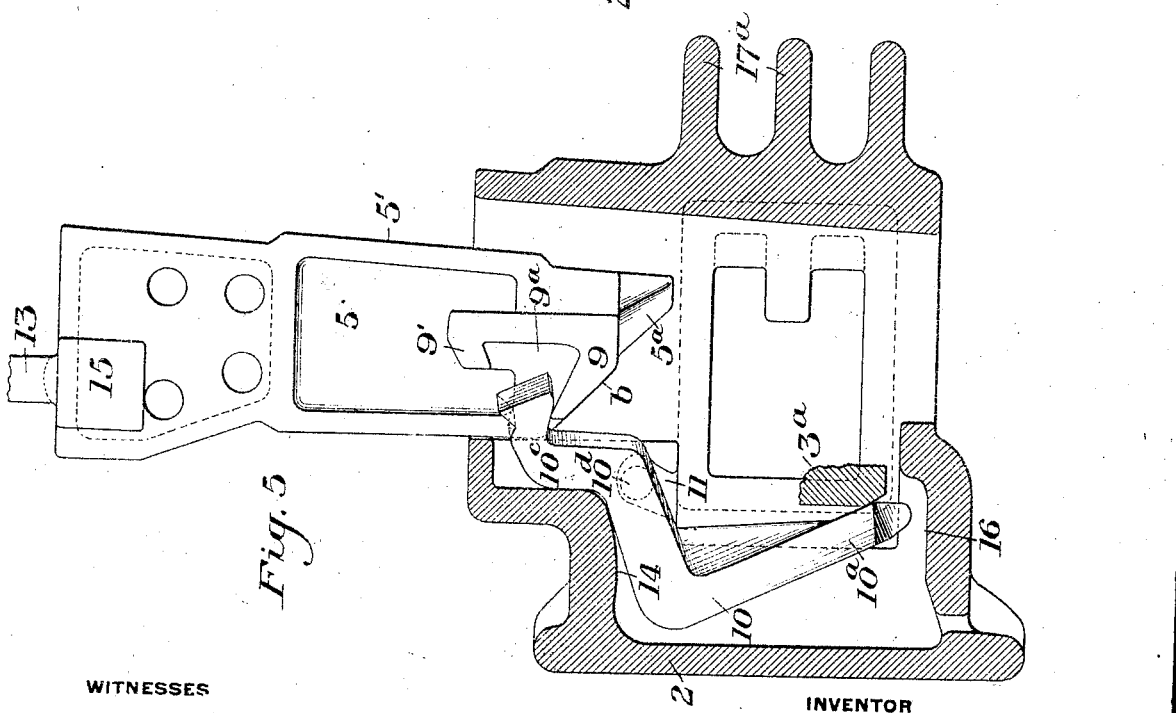

H. T. KRAKAU.
CAR COUPLING.
APPLICATION FILED JUNE 1, 1908.
1,040,551.
Patented Oct. 8, 1912.
6 SHEETS—SHEET 4.
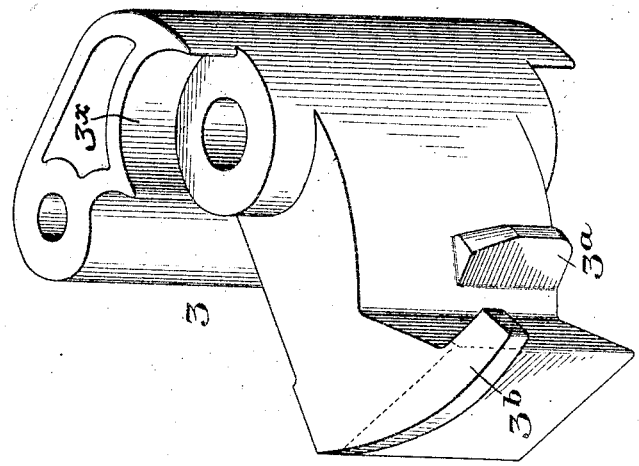
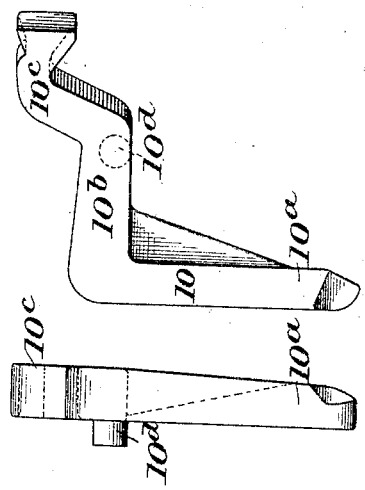
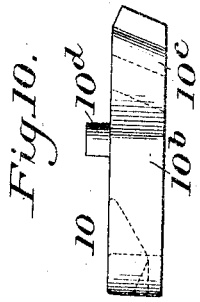
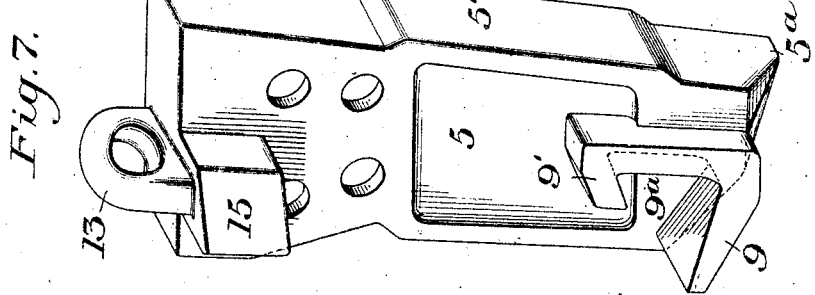
WITNESSES
R. A. Balderson
H. M. Corwin
INVENTOR
H. T. Krakau,
by Bakewell, Byrnes & Parmelee,
his Attys H. T. KRAKAU.
CAR COUPLING.
APPLICATION FILED JUNE 1, 1908.
1,040,551.
Patented Oct. 8, 1912.
6 SHEETS—SHEET 5.
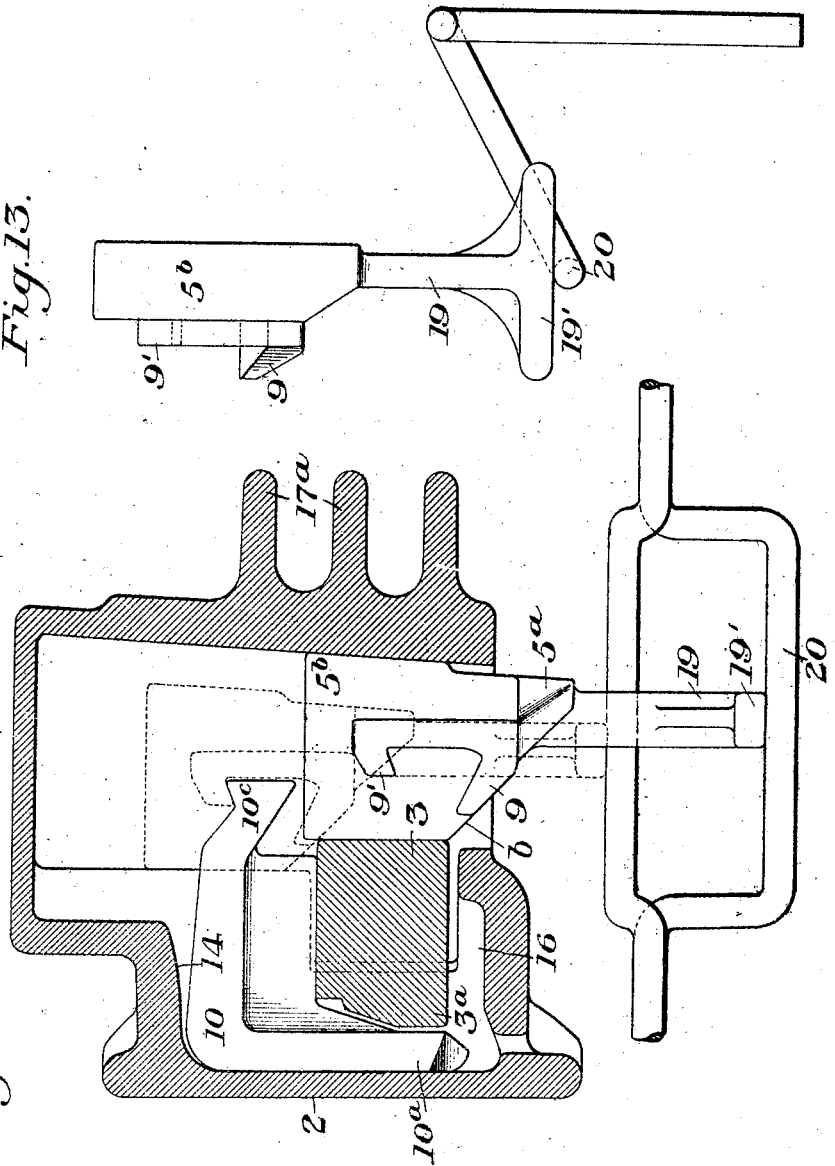
WITNESSES
INVENTOR H. T. KRAKAU.
CAR COUPLING.
APPLICATION FILED JUNE 1, 1908.
1,040,551.
Patented Oct. 8, 1912.
6 SHEETS—SHEET 6.
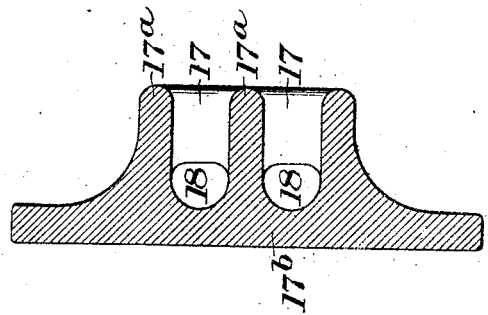
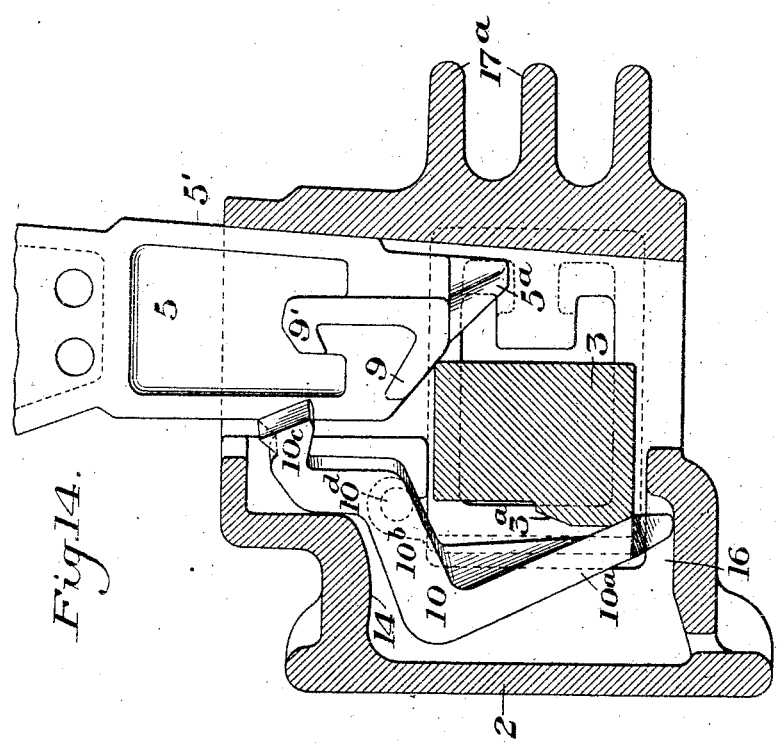
WITNESSES
INVENTOR
H. T. Krakau,
by Bakewell, Byrnes & Parmelee,
his Attys.

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

CAR-COUPLING.

1,040,551.

Specification of Letters Patent. Patented Oct. 8, 1912.

Application filed June 1, 1908. Serial No. 435,956.

*To all whom it may concern:*

Be it known that I, HARRY T. KRAKAU, of Cleveland, in the county of Cuyahoga, State of Ohio, have invented a new and useful Car-Coupler, of which the following is a specification, reference being had to the accompanying drawings, forming part of this specification, in which—

Figure 1:
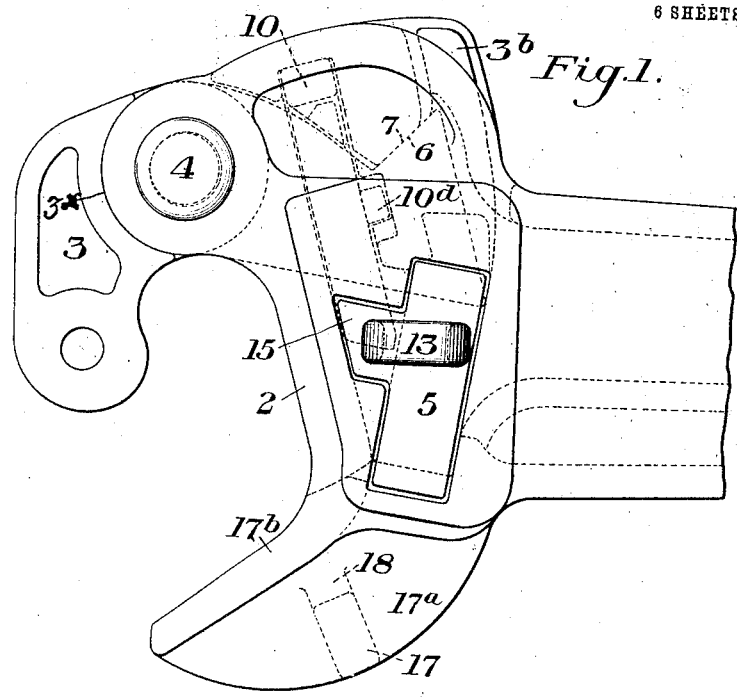
Figure 2:
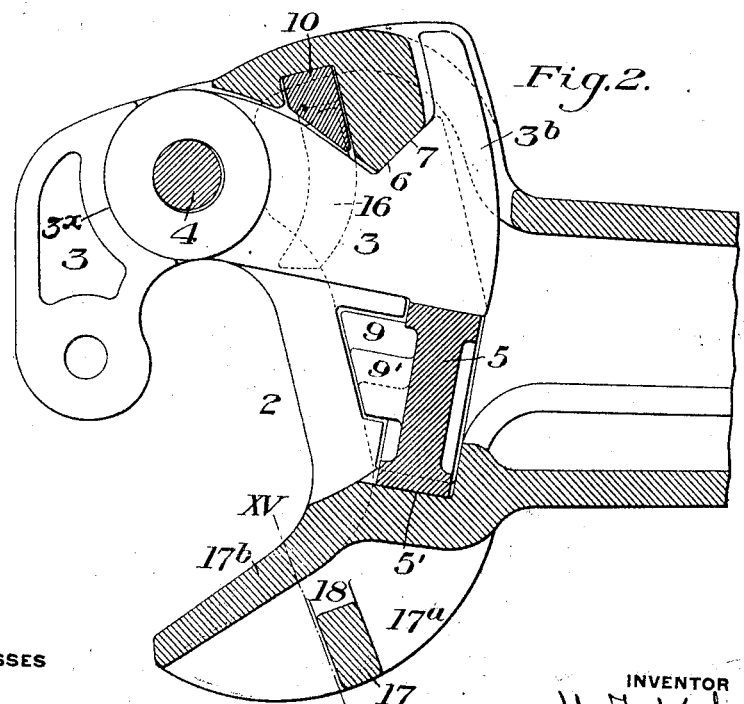

Figure 1 is a plan view of my improved coupler; Fig. 2 is a horizontal section thereof; Fig. 3 is a vertical cross section, showing the parts of the coupler in locked position; Fig. 4 is a similar view, showing the parts of the coupler lock-set; Fig. 5 is a vertical cross section illustrating the parts in the position which they occupy when the knuckle is thrown fully open; Fig. 6 is a horizontal section of Fig. 5; Fig. 7 is a perspective view of the lock; Fig. 8 is a front elevation of the knuckle-throwing piece; Fig. 9 is a side elevation; Fig. 10 is a top plan view thereof; Fig. 11 is a perspective view of the knuckle; Fig. 12 is a vertical cross section illustrating a modified construction of the device; Fig. 13 is an elevation of the lock used in the coupler of Fig. 12; Fig. 14 is a detail view showing the operation of the lock in closing the knuckle; Fig. 15 is a sectional view showing the preferred construction of the coupler casting.

The great increase in the weight of cars and length of trains which has come about in recent years has resulted in putting very severe strains upon the parts of car couplers, which causes frequent breakage of the parts. This evil has become a very serious one, and it is the purpose of my invention to meet it by providing a car coupler whose parts are so constructed that they will resist successfully the external strains to which they are put in use. I accomplish this desirable purpose, notwithstanding the difficulties created by service conditions and by the necessity that all new couplers must coöperate with couplers already in use.

Referring to the drawings which illustrate the invention in what I deem to be its preferable form, 2 represents the coupler-head, which has twin jaws, and 3 is the knuckle which is pivoted to the coupler head, preferably by a pivot pin 4.

5 is the vertically movable lock which operates through a recess in the coupler head and preferably, when in locked position, extends from top to bottom of the coupler head, as shown in Fig. 3.

The knuckle 3 has a rearwardly-extending tail, at the back of which is preferably an inclined bearing surface 6 adapted to fit against a correspondingly inclined bearing surface 7 on the interior of the coupler head and to be held by the lock positively against the same. This lock, which moves vertically, is of wedge shape, having downwardly converging sides 5', so that as it tends to descend by gravity and does not engage any stop or support on the coupler-head even when it is in its lowest position it becomes closely wedged in the recess between the coupler head and the forward side of the knuckle tail, and holding the knuckle tail firmly against the bearing surface 7 as above described, prevents loose lateral motion thereof. By reason of the downwardly converging sides of the lock and the longitudinally inclined surfaces 6 and 7, the knuckle is drawn slightly rearwardly when locked by the lateral pressure of the lock which presses the surfaces 6 and 7 together. The combined action of the coacting wedging faces of the knuckle tail and head and of the knuckle tail and lock results in holding the knuckle rigidly against its bearings in the head, the hub bearings 3× being drawn tightly back against the corresponding and coacting bearing surfaces on the head. In this locked position, the knuckle forms a practically integral part of the coupler head, so far as any looseness or movement in its locked position is concerned. The pivot pin hole in the hub of the knuckle is provided with sufficient clearance at the rear of the pivot pin to give freedom for the knuckle in its opening and closing movements. It will be seen that any wear or deflection of the bearing surfaces of the pin and pin hole will not prevent a tight locking of the knuckle for the wedge lock, and the inclined surfaces 6 and 7 will automatically take up any looseness which develops. The locking of the knuckle tail between the lock and the surface 7 and the widening of the distances between the bearing faces of the tail toward its rear end removes all longitudinal strains from the pivot pin and puts the stress of pulling upon the tail of the knuckle behind the pivot pin and the ears of the coupler, and relieves the pivot pin even initially from the pulling strain. It is therefore immaterial whether the standard pin is used or not. If the pin breaks the pulling capacity of the coupler is not diminished nor the position of the knuckle altered, and my coupler has important and novel advantages in this respect.

At its lower end the lock 5 has a downwardly projecting toe $5^a$, which prevents the lock when raised from moving laterally to the back of the knuckle, and it also has an inclined projecting lug 9, shown in Figs. 4 and 7, and an upper shoulder 9' affording an intermediate recess $9^a$ in which the end of the opening piece extends during the operation of the latter. Referring to the projecting toe $5^a$, Fig. 5 shows the parts with the knuckle thrown completely open and the lifting strain still exerted on the lock, which is pulled over to the knuckle side of the coupler head, as far as the opening in the top wall will permit. When the lifting strain is released, the knuckle still remaining in open position, as shown in Fig. 6, the lock will drop until its lower horizontal face at the base of the lug 9 and adjacent to the toe $5^a$ rests upon the upper surface of the knuckle tail. The toe $5^a$ then projects downwardly below the upper surface of the knuckle tail and occupies the space back of the rear end of the knuckle tail and between the knuckle and the locking face of the coupler head, as shown in Fig. 6. In this position, as the back of the lock is held from moving rearwardly by the rear surface of the hole in the top of the coupler head, the lock can not move laterally toward the knuckle side of the coupler into an abnormal position. The hole in the top of the coupler head is larger than that portion of the lock within it when the lock is partially raised, and were it not for the toe $5^a$, the lock might accidentally be brought into abnormal position on the wrong side of the knuckle tail. In such case, when the knuckle was closed, the bottom of the lock, which would be resting on the upper surface of the tail, might move laterally with it and come into a cramped position, where it would not drop into locking position, except for this toe.

The opening piece 10 is of angular shape, as shown in Fig. 3 and in Figs. 8, 9 and 10, and has a downwardly projecting opening member $10^a$ and a forwardly projecting member $10^b$ which terminates in a portion $10^c$ adapted to coöperate with the parts 9 and 9' in lock-setting and opening. This lock-setting and opening member has a laterally projecting lug $10^d$ which fits within an inclined guide recess 11 in the interior of the coupler, and permits slight vertical bodily motion of the opening piece and prevents its displacement.

When the coupler is locked, as shown in Figs. 1, 2 and 3, the lock is between the tail of the knuckle and the wall of the coupler head, and the opening piece 10 extends back of and over the coupler knuckle, its portion $10^c$ projecting in the path of the lug 9. If it be desired to unlock the coupler and to put the lock in lock-set position, the lock is raised by a suitable lifting lever 12 or other device, connected to it by an eye or connecting device 13, so that the inclined projection 9 engages the under surface of the portion $10^c$ of the opening member, and will draw the shoulder 9' on the lock laterally into engagement with the top of the portion $10^c$, which will support the lock in lock-set position, leaving the knuckle free to be swung open by the parting of the cars. If the car is not coupled to another car and it is desired to throw the knuckle open into coupling position, the lock 5 is lifted to the extreme of its upward movement. This brings the lug 9 on the lock into engagement with the member $10^c$ of the opening device 10 and causes this device to tilt, as shown in Fig. 5, the lug $10^d$ moving upwardly in the recess 11 and the member $10^b$ tilting with a rolling action upon the upper surface 14 of the coupler head, as shown in Figs. 3 and 5. By this means the lower member $10^a$ of the opening device is swung forwardly, as shown in Fig. 5, and engaging a projection $3^a$ on the rear of the tail of the knuckle, swings the knuckle into open position, as shown in Fig. 6. By reason of the rolling action above mentioned, the lower end of the member $10^a$ operates on the knuckle with a rolling action, so that the points of contact are constantly shifting as the knuckle is moved open and the end of the part moves horizontally without any simultaneous vertical movement. The member $10^a$ therefore merely pushes the knuckle open without tendency to slide thereon. The member $10^c$ also operates on the projection 9 with a rolling action. This prevents friction at these points and renders the motion easy.

An important feature of the invention is the substantial construction of the lock and the broad bearing surfaces which the lock has against the tail of the knuckle and the opposing surface of the draw-head. The bearing faces of the lock on the draw-head, the knuckle on the lock and the knuckle on the surface 7 of the draw-head are equal in area, so that the pulling strains are distributed over equal surfaces on both sides of the knuckle and on both sides of the lock, thus providing no superfluous bearing surfaces, nor any which are relatively inadequate.

The lines of a horizontal section through the bearing surfaces of the lock on opposite sides thereof are parallel, and the strains are transmitted directly across its body and the surfaces are substantially in the center line of draft, that is, half this area is above and half below that line. This makes the bearing substantial and firm and prevents injury to the parts during the strains to which they are subjected. For these purposes I prefer to construct the lock as shown in Figs. 1 and 7 oblong in cross section, with its longer dimension in a direction nearly at right angles to its bearing surfaces. The bearing surface of the lock on the knuckle is at right angles to the line of movement of the knuckle-tail, and any wear or loosening of the knuckle-tail will not decrease the locking surface of the knuckle, for the lock, by reason of its wedge shape, will drop and compensate for such loosening. If the knuckle should wear at its rear bearing 6, the wedge-shape of the lock, by forcing the tail rearwardly so as to keep the surfaces 6 and 7 in contact will take up the wear and will tend to close the outer end of the knuckle inwardly.

In order to permit the insertion of the lock with its projecting portions 9, 9′, into the coupler head, it is necessary that the hole at the top of the coupler should be somewhat large, and to prevent dirt and gravel or portions of the burden of the car from entering the recess thus afforded I provide the lock at its upper portion with a lateral projection 15, which, when the lock is down in locked position, fills the enlarged hole and affords a substantially closed construction to the top of the coupler, as shown in Fig. 1. The lock and knuckle are assembled in the coupler head without difficulty, the lock being tipped as it is inserted into the hole in the top of the coupler head, as will be apparent to those skilled in the art.

To guide the opening piece during its forward motion I prefer to provide a forwardly extending curved groove 16 at the base of the coupler head, as shown in Fig. 2, and I bevel the forward side of the opening device, as shown in this figure, in order to conform to the inclined surface of the rear of the knuckle to which it is opposed. I also provide the knuckle with a projection or shelf 3^b at the upper portion of the rear end of the tail, which operates to support the lock when the knuckle is in the open position shown in Fig. 6.

An important feature of the invention is the function of the lock in closing the knuckle. Not only is the lock made of a slight vertical wedge shape so that the lock will settle by gravity into a position to keep the knuckle tail tight in its bearings, but there is a steep incline $b$ at the base of the lock which engages the forward and upper surfaces of the knuckle tail so that when the knuckle is only partially closed and the coupler knuckle is left free to move, the lock, by virtue of its own weight, will close the knuckle and lock the coupler, as shown in detail in Fig. 14. Heretofore it has been necessary for the forward face of one knuckle to engage the face of the opposing coupler in order to lock the coupler, and frequently there has been such a close fit between the couplers, or the couplers have been so far out of line horizontally or vertically, that the knuckles could not close far enough to permit the couplers to lock. In this coupler there is a great advantage in that respect, for the bottom of the lock being narrower than the top, the coupler will securely lock with the knuckle in varying positions, and the knuckle need only be partially closed to enable its own lock to close it completely, independent of any action of the knuckle upon the opposing coupler.

I preferably provide the coupler with vertical ribs 17 tying the horizontal ribs 17^a of the guard arm at their middle points so as to prevent distortion of the horizontal ribs when blows are received upon the end of the guard arm. These ribs are not tied to the vertical wall 17^b of the guard arm but have a space 18 between, so that there is no tendency to create a breaking point in the guard arm. The vertical ribs merely hold the horizontal ribs together at their outer edges.

The knuckle tail is preferably made in such vertical section from its point of junction with the hub of the knuckle to its point of bearing against the lock, that it will withstand as much strain as the hub of the knuckle itself would withstand if there were no pin hole. This puts the burden of strain upon the hub of the knuckle which is restricted in dimensions by the necessities of operation with old couplers rather than any new design. The hub can be increased in strength by reducing the size of the pin, which is practicable in this coupler because the pin is merely for pivotal purposes and carries none of the strains of pulling. The section of the knuckle tail affords an unusual depth for locking surface which is greatly needed on account of the increased strains put upon the coupler, strains often in excess of the compressive limit of the material when confined to ordinary small locking surfaces.

In the modification of my invention shown in Figs. 12 and 13 I adapt the coupler to be used with knuckle opening devices which operate from below. In these figures the lock 5^b is inclosed within the coupler head, the roof of the coupler head 2^a being unperforated. The locking portion of the lock conforms in shape to the locks shown in the other figures, and has parts 9ª and 9ᵇ which correspond to the parts 9, 9' above described. It has extending from its lower end a stem 19 terminating at its base preferably in a T-shaped head 19', adapted to be engaged by the lock-lifting crank 20. On turning this crank, which is operated at the side of the car, the lock is raised and the couplers can be successfully brought into lock-setting and opening positions as described above. In Fig. 12 the parts are shown by full lines in locked position, and by dotted lines in lock-set position. When in these positions the opening piece 10ᵈ is supported by its rib resting on the top of the knuckle tail. This opening piece 10ᵈ has members 10ᵉ and 10ᶠ corresponding to the members 10ᶜ and 10ᵃ which I have described above. These figures also show the knuckle 3ᶜ, the projection 3ᵈ, the coupler surface 14ᵃ, the incline b', the toe 5ᶜ, the ribs 17ᶜ, and the parts 9ᵃ, 9ᵇ, 16ᵃ, which correspond to the parts 3, 3ᵃ, 14, b, 5ᵃ, 17ᵃ, 9, 9', 16, already described. This construction permits a somewhat modified form of the opening piece, and its forward end can be extended downwardly from the intermediate member thereof.

Many modifications of the invention in respect of the form and arrangement of the parts may be made by those skilled in the art, since

What I claim is:

1. In a car coupler, a coupler head, a knuckle having a tail, a pivot pin and a lock, said head being provided with a bearing surface coöperating with a bearing surface on the knuckle to limit the rearward movement thereof when it has been moved to such a position as to take the strain off the pivot pin, and means for so moving said knuckle and maintaining it in such position in spite of looseness or wear of said bearings and irrespective of the amount of looseness or wear at the other points, such means consisting of a rearwardly-extending outwardly-inclined bearing in the head to the rear of the pivot pin, a correspondingly inclined face on the knuckle tail free when in locked position to coöperate at all times with said bearing in the head, the lock having wedging surfaces engaging wedging surfaces on the coupler head and on the front face of the knuckle tail to maintain said knuckle tail tight against the inclined bearing of its face against the head and thus to draw the knuckle tightly against the bearings limiting its rearward movement, and provision whereby the lock may automatically move from initial locking position to compensate for looseness or wear of the parts.

2. In a car coupler, a coupler head, a knuckle, a loosely fitting pivot pin for the knuckle, said head being provided with a bearing surface acting at all times when the parts are in locked position to limit the rearward movement of the knuckle, and means to cause such rearward movement consisting of a rearwardly-extending outwardly-inclined surface in the head with which a corresponding surface on the knuckle tail is adapted to coöperate at all times irrespective of the relative wear or initial variation of any of the parts or surfaces, and a freely moving gravity lock of wedge shape in vertical cross-section engaging the coupler head and the front face of the knuckle tail.

3. In a car coupler, a coupler head, a knuckle, said head being provided with a bearing surface acting at all times, and irrespective of wear and of relative amounts of wear of the various parts, to limit the rearward movement of the knuckle when the parts are in locked position, and provided also with a rearwardly-extending outwardly-inclined bearing adapted, at all times when the parts are in locked position, and irrespective of wear and the relative amount of wear of the various parts, to coöperate with a corresponding bearing on the knuckle tail, and means for tightening both of said bearings and keeping them tight, such means consisting of a freely moving gravity lock of wedge shape in vertical cross-section engaging the coupler head and the front face of the knuckle tail.

4. A car coupler having a vertically movable lock, a knuckle, an opening member extending over the knuckle, and a lock adapted to lockset on the opening member, said lock and member having engaging portions which coact to move the lock laterally into lockset position when said surfaces are brought into engagement by the lifting movement of the lock.

5. A coupler knuckle, having a tail with a bearing surface to engage the lock, and another bearing surface to engage the coupler-head to resist the movement of the knuckle under pulling strains, the elastic limit of the vertical cross section of the material of the tail with reference to the strains to which it is subjected in pulling being at least as great as the elastic limit of the vertical cross section of the material through the hub of the knuckle with reference to the strains to which it is subjected in pulling.

6. In a car coupler, a coupler head, a pivoted knuckle, a swinging knuckle-opening member, said member having a rolling bearing upon the knuckle tail and also having a shifting fulcrum whereby the member contacts with the knuckle tail in substantially the same horizontal plane during the opening movement of the knuckle.

7. In a car coupler, a coupler head, a pivoted knuckle, and a swinging knuckle-opening member, said member having a rolling bearing upon the knuckle tail, and also having a shiftable rocking bearing upon the coupler head, whereby said member contacts with the knuckle tail in substantially the same horizontal plane during the opening movement of the knuckle.

In testimony whereof, I have hereunto set my hand.

HARRY T. KRAKAU.

Witnesses:
 ANNA E. WALLACE,
 FREDERICK H. DAVIS.

Copies of this patent may be obtained for five cents each, by addressing the "Commissioner of Patents, Washington, D. C."